United States Patent
Edlund et al.

(10) Patent No.: US 8,086,566 B2
(45) Date of Patent: *Dec. 27, 2011

(54) TRANSACTION CONSISTENT CONTENT REPLICATION

(75) Inventors: Stefan B. Edlund, San Jose, CA (US); Hui-I Hsiao, Saratoga, CA (US); Joshua W. Hui, San Jose, CA (US); Steven J. Watts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 401 days.

This patent is subject to a terminal disclaimer.

(21) Appl. No.: 12/338,209

(22) Filed: Dec. 18, 2008

(65) Prior Publication Data

US 2009/0119351 A1    May 7, 2009

Related U.S. Application Data

(63) Continuation of application No. 11/936,594, filed on Nov. 7, 2007, now Pat. No. 7,483,922.

(51) Int. Cl.
*G06F 17/30* (2006.01)
(52) U.S. Cl. .................. 707/615; 707/616; 707/638
(58) Field of Classification Search .................. 707/615, 707/616, 638
See application file for complete search history.

(56) References Cited

U.S. PATENT DOCUMENTS

| 5,832,514 | A | 11/1998 | Norin et al. |
| 6,678,882 | B1* | 1/2004 | Hurley et al. ................. 717/121 |
| 7,194,486 | B2* | 3/2007 | Ishikawa et al. ..................... 1/1 |
| 7,290,018 | B2* | 10/2007 | Muecklich et al. ........... 707/624 |
| 7,483,922 | B1* | 1/2009 | Edlund et al. ......................... 1/1 |
| 7,483,927 | B2* | 1/2009 | Anglin et al. ......................... 1/1 |
| 2004/0098425 | A1 | 5/2004 | Wiss et al. |
| 2004/0199552 | A1 | 10/2004 | Ward et al. |
| 2004/0249870 | A1* | 12/2004 | Jeevanjee et al. ............. 707/204 |
| 2007/0118577 | A1* | 5/2007 | East .............................. 707/204 |
| 2007/0130229 | A1* | 6/2007 | Anglin et al. ................. 707/204 |
| 2007/0255763 | A1* | 11/2007 | Beyerle et al. ................ 707/201 |
| 2008/0005199 | A1* | 1/2008 | Chen et al. .................... 707/204 |

OTHER PUBLICATIONS

US 7,719,178, 01/2008, Chen et al. (withdrawn)*

* cited by examiner

*Primary Examiner* — Debbie Le
(74) *Attorney, Agent, or Firm* — Cantor Colburn LLP; Van Nguy

(57) ABSTRACT

Exemplary embodiments of the present invention relate to methodologies, computer program products and systems for the support of content replication, wherein transaction-level data replication consistency is guaranteed. Further, the exemplary methodologies of the present invention can be implemented while incurring little or no additional I/O overhead.

2 Claims, 1 Drawing Sheet

TRANSACTION CONSISTENT CONTENT REPLICATION

CROSS-REFERENCE TO RELATED APPLICATION

This application is a continuation of U.S. patent application Ser. No. 11/936,594, filed Nov. 7, 2007, now U.S. Pat. No. 7,483,922, the disclosure of which is incorporated by reference herein in its entirety.

BACKGROUND OF THE INVENTION

1. Field of the Invention

This invention relates to data replication operations and particularly to transaction consistent data replication operations.

2. Description of Background

As currently applied, data replication technology is utilized to increase data availability between computing systems and/or the scalability system. Database systems also can be configured to exploit the logging and recovery infrastructures in order to support data replication operations. Computing systems such as email and file systems typically rely on taking snapshot of data changes and delivering the data changes to replica sites for data replication support. Generally, database replication provides transaction level consistency in regard to data replication, while email and file systems provide data level data replication consistency. As such, transaction level consistency guarantees that the data contained within a data change set that is sent from a primary server to a replica site is consistent. In contrast, data level consistency guarantees that only committed data is sent to a replica site, however, multiple data objects that are updated by a transaction may be delivered to a replica site in one or more data change sets.

Content management systems in operation are similar to a file systems, but contain a much richer semantic and transaction model. Content management systems are utilized in conjunction with content repositories to store content data and meta-data that is associated with the content data (e.g., content data version meta-data information). Typically, transaction level consistency is necessitated for the enforcement of content semantics and constraints within a content management system. This approach differs from the traditional database approach of logging every operation that occurs within a system, wherein this approach eventually introduces a significant amount of I/O overhead within a system in addition to causing a performance on the system. Thus, a logging operation based approach is not an operational efficient approach. In addition, content management systems may comprise content semantics that are not aware of or supported by database systems. As such, traditional database logging does not have the necessary functions to support content management level replication

SUMMARY OF THE INVENTION

The shortcomings of the prior art are overcome and additional advantages are provided through the provision of a method for the transaction consistent data content replication. The method comprises replicating at least one data object from a first server to a second server; wherein the data object is annotated with meta-data, the meta-data comprising transaction identification information, storing in a mapping table a mapping between a transaction identifier and a commit sequence number, the commit sequence number being a monotonically incrementing number matching order transactions as they are committed, and applying updates to the data object, wherein respective updated data objects comprise a data object change set.

The method also comprises delivering the updated data object to a database, wherein the updated data object is associated with the data object change set, delivering a current image and a current transaction identifier of the updated data object in conjunction with a previous image and a previous transaction identifier of the data object prior to the current updating changes performed upon the data object to a replication accelerator, wherein the current and previous images of the data object comprise data updates and deletions that have been performed upon the data object, and storing the current and previous data object images in memory at the replication accelerator.

The method yet also comprises receiving a request for the data object change set, accessing the database and the mapping table to retrieve the change set, the change set detailing updates that have been performed upon the data object since a previous replication operation, analyzing the mapping table and the previous transaction identifiers of the replication accelerator, where in the event that it is determined that an object comprised within the data consistent change set does not contain proper transactional consistent information then a correct version of the object is retrieved from the replication accelerator and the correct object version is utilized to restore the correct transactional consistent image to the object, and returning the data object change set in response to the request.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
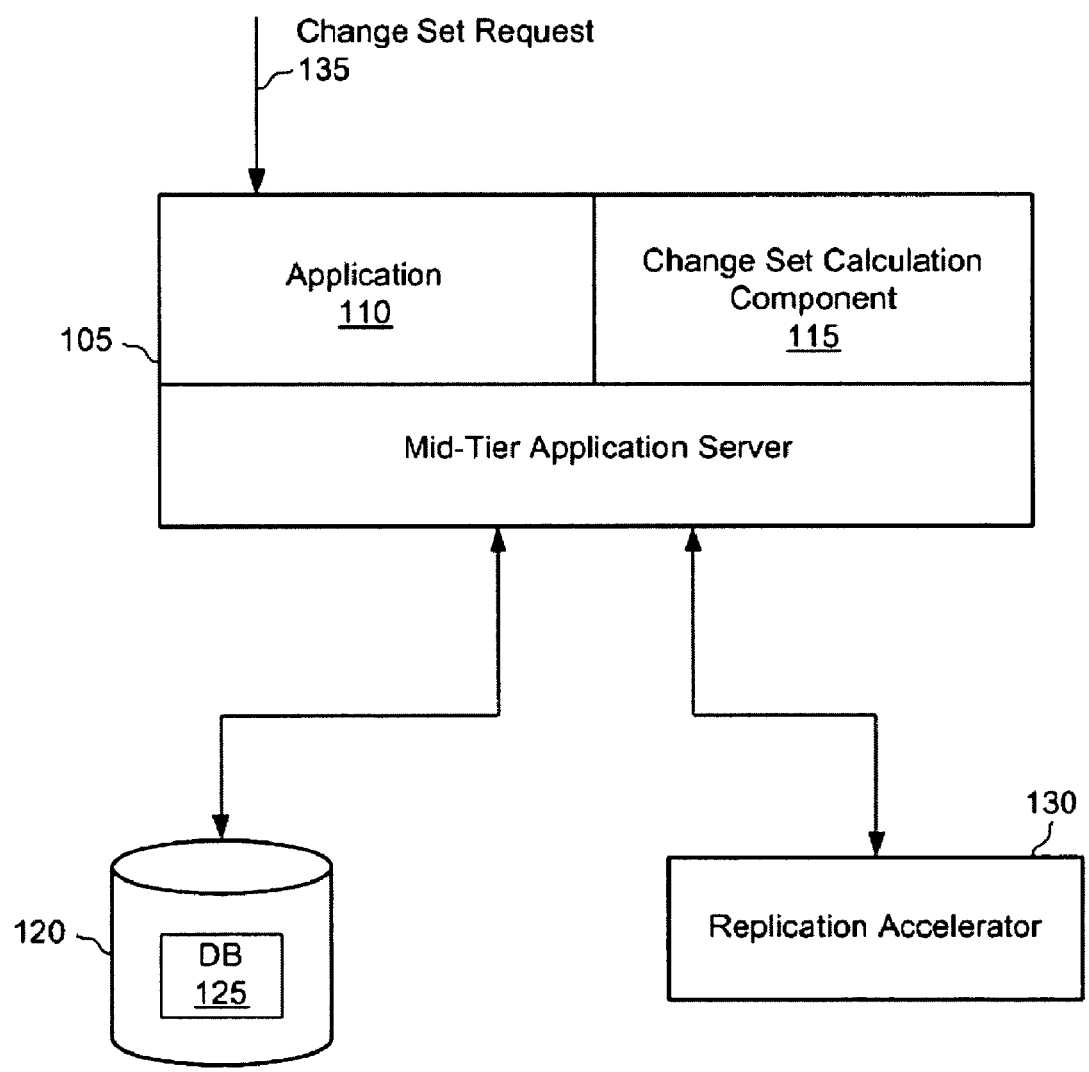
FIG. 1 illustrates one example of a content management replication system in accordance with embodiments of the present invention.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Aspects of the exemplary embodiment of the present invention can be implemented within a conventional computing system environment comprising hardware and software elements. Specifically, the methodologies of the present invention can be implemented to program a conventional computer system in order to accomplish the prescribed tasks of the present invention as described below.

Exemplary embodiments of the present invention relate to methodologies, computer program products and systems for the support of content replication, wherein transaction-level data replication consistency is guaranteed. Further, the exemplary methodologies of the present invention can be implemented while incurring little or no additional I/O overhead.

Within exemplary embodiments of the present invention a two-prong approach is implemented to track any changes within data that is to be replicated from a first processing system to a second processing system. Initially, a data object that is to be replicated is annotated with meta-data information—wherein the meta-data comprises transactional identification information in addition to the action that was performed upon the data object.

Within the exemplary embodiments of the present invention it is assumed that transactions are ordered in their commit order. Thus, transactions are associated with a monotonically increasing sequence number (i.e., the commit sequence number). At a transaction commit time, the current sequence number is incremented by one and assigned to the transaction. A mapping between the transaction identifier and the commit sequence number is stored at a mapping table.

Associating the meta-data with data objects in combination with a set of transaction identifiers retrieved from the mapping table helps to identify a data change set in relation to a last synchronization point. However, due to the presence of concurrent updates, the change set may not be a transactional consistent change set. To deal with any in-flight transactions that may bring transactional inconsistency to a change set within exemplary embodiments of the present invention a replication accelerator software component is implemented.

In operation the replication accelerator component 130—as shown in FIG. 1—keeps track in memory (either physical memory or virtual memory) of the before images of a data object that is being updated by a currently active transaction, as well as the transaction identifiers associated with those images. The replication component 130 is executed at a processing system that is remote to the mid-tier application server 105. Thus, used in conjunction with the annotated meta-data, the transaction identifiers in the replication accelerator 130 are matched against the set of transaction identifiers identified since the last synchronization point, and the change set is patched with transactional consistent object images. In term of the memory requirement, the replication accelerator 130 only needs to retain the active changes to a data object long enough to cover a replication session. Thus, there is no requirement for keeping active changes to a data object in persistent storage for the handling of system failures.

The utilization the data object annotation technique in conjunction with the replication accelerator operations within exemplary embodiments of the present invention provide an efficient method for the retrieval of a transaction consistent data change set for current replication data object information. Since the changes to data objects can be tracked either by annotation (object meta-data) or by an in-memory logger (i.e. replication accelerator), there is little or no I/O overhead that is associated with the present methodology.

As shown in FIG. 1, an application 110 residing on a mid-tier application server 105 is implemented to apply updates to an underlying database 125 residing at a storage device 120. The application 110 also propagates before and after images of updates and deletes of data objects, and delivers the before and after data object images to the replication accelerator 130. The replication accelerator 130 stores the before and after data object images in memory in order to track any changes that may be made to the data object.

In the event that a request is made for a change data set, a change set calculation component 115 accesses the database 125 at the storage device 120 in order to retrieve a data consistent set of changes that has occurred since the occurrence of a last data object replication. Within exemplary embodiments, the change table calculation component 115 uses mapping table annotations that have been associated with respective data objects that are stored within the database 125 in order to identify and retrieve the proper data object change set.

The change set calculation component 115 consults the replication accelerator 130 to determine whether any in-flight transactions have updated data objects that are part of the data object change set. If it is determined that an in-flight transaction has updated an object that is part of a data object change set, an image of the identified data object are retrieved from the replication accelerator 130. The data object image that is retrieved from the replication accelerator 130 is used to patch, or repair the change set that has been retrieved from the database 125 in order to make data object change set that has been retrieved from the database 125 transactionally consistent before returning the data object change set to a requesting client or site.

As mentioned above, in order to guarantee transaction consistency and to efficiently construct transaction consistent data object change sets, the replication accelerator 130, which maintains before and after images of objects that are being updated by currently active transactions. In operation, the replication accelerator 130 captures changes made by any active/in-flight transactions between a first and a second computing system. The replication accelerator 130 then uses the captured information (including the before-image) to bring a snapshot (i.e., data consistent) data object change set to a transaction consistent state.

The replication accelerator 130 stores changed images in memory. Within exemplary embodiments of the present invention if there is not enough physical memory to capture changes for all active transactions, disk based virtual memory mechanism can be implemented. In the event that the replication accelerator 130 crashes, the transactionally consistent change set calculation component 115 can be disabled. Further, when the replication accelerator 130 is back on-line, transactional consistent replication will again be provided and no updates are lost while replication accelerator is down.

If both the mid-tier application server 105 and replication accelerator crashes 130, there's no problem since all in-flight transactions must have been rolled-back, and the replication accelerator 130 can restart with an empty change set. If the mid-tier application server 105 crashes, all in-flight transactions are rolled back, including rows inserted into the mapping table. Hence the replication accelerator will contain change images for transactions that were rolled back, but since they are never queried they are never used and will be eventually overwritten by newer entries.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product that includes a computer readable medium useable by a processor, the medium having stored thereon a sequence of instructions which, when executed by the processor, causes the processor to perform transactional consistent data content replication operation, by:

replicating at least one data object from a first server to a second server; wherein the data object is annotated with meta-data, the meta-data comprising transaction identification information;

storing in a mapping table a mapping between a transaction identifier and a commit sequence number, the commit sequence number being a monotonically incrementing number matching order transactions as they are committed;

applying updates to the data object, wherein respective updated data objects comprise a data object change set;

delivering the updated data object to a database, wherein the updated data object is associated with the data object change set;

delivering a current image and a current transaction identifier of the updated data object in conjunction with a previous image and a previous transaction identifier of the data object prior to the current updating changes performed upon the data object to a replication accelerator, wherein the current and previous images of the data object comprise data updates and deletions that have been performed upon the data object;

storing the current and previous data object images in memory at the replication accelerator only during a replication session and without storing active changes to the data object in the first server;

receiving a request for the data object change set;

accessing the database and the mapping table to retrieve the change set, the change set detailing updates that have been performed upon the data object since a previous replication operation;

analyzing the mapping table and the previous transaction identifiers of the replication accelerator, where in the event that it is determined that an object comprised within the data consistent change set does not contain proper transactional consistent information then a correct version of the object is retrieved from the replication accelerator only during the replication session and the correct object version is utilized to restore the correct transactional consistent image to the object; and returning the data object change set in response to the request.

2. A computer program product of claim 1, wherein accessing the database to retrieve the change set comprises accessing the database using table annotations that have been associated with the data object change set.

* * * * *